(12) United States Patent
Maeda

(10) Patent No.: US 6,261,010 B1
(45) Date of Patent: Jul. 17, 2001

(54) PRINTING APPARATUS AND PRINT CONTROL METHOD

(75) Inventor: Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/215,152

(22) Filed: Dec. 18, 1998

(30) Foreign Application Priority Data

Dec. 24, 1997 (JP) .................................................. 9-355653

(51) Int. Cl.[7] ........................................................ B41J 11/44
(52) U.S. Cl. ................................. 400/76; 400/70; 400/61; 400/120.02
(58) Field of Search .............................. 400/76, 70, 61, 400/120.02

(56) References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 |
| 4,446,470 | * 5/1984 | Sugiyama et al. | 346/140 |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 |
| 4,723,129 | 2/1988 | Endo et al. | 346/1.1 |
| 4,740,796 | 4/1988 | Endo et al. | 346/1.1 |
| 5,646,749 | * 7/1997 | Omi et al. | 358/501 |
| 5,899,614 | * 5/1999 | Maeda et al. | 400/62 |
| 5,927,874 | * 7/1999 | Kikuta et al. | 400/120.02 |

FOREIGN PATENT DOCUMENTS

| | | |
|---|---|---|
| 54-56847 | 5/1979 | (JP) . |
| 59-123670 | 7/1984 | (JP) . |
| 59-138461 | 8/1984 | (JP) . |
| 60-71260 | 4/1985 | (JP) . |

* cited by examiner

*Primary Examiner*—John S. Hilten
*Assistant Examiner*—Charles H. Nolan, Jr.
(74) *Attorney, Agent, or Firm*—Fitzpatrick, Cella, Harper & Scinto

(57) ABSTRACT

Printing apparatus and print control method for efficiently utilizing buffer memories. In a case of performing printing operation by controlling scanning of a printhead and four buffer memories where K, C, M and Y color image data are temporarily stored respectively, the color component data is inputted to the buffer memories while monitoring the data storage, and based on the monitoring result, discrimination is made as to whether or not at least one of the buffer memories has become full. Also, a print width, a conveyance amount of a print medium, and color component data to be cleared upon printing are dynamically determined based on a printable width of the printhead and the contents of the inputted color component data (monochrome image, color image, mixture of monochrome and color image). Printing is performed on print paper by scanning the printhead based on the discrimination result and the determined print width, the print paper is conveyed for the determined conveyance amount, and color component data used in printing is cleared from the buffer memories.

35 Claims, 15 Drawing Sheets

PRINTING APPARATUS AND PRINT CONTROL METHOD

BACKGROUND OF THE INVENTION

The present invention relates to a printing apparatus and a print control method. More particularly, the present invention relates to a printing apparatus having a printhead and a buffer memory for storing image data, and a print control method for transferring image data stored in the buffer memory to a printhead and printing an image on a print medium.

In a conventional print operation of a so-called serial printer, at least one buffer memory is employed to store image data for an image area printed by a single scan of a printhead, and an image is printed on a print medium by transferring the image data directly from the buffer memory to the printhead (hereinafter, such buffering method will be referred to as "scan-based buffering"). Moreover, in a case of using a color printer comprising a printhead, in which a plurality of head units are each provided for respective colors, and have the same number of pixels (same print width), are arrayed in the scanning direction, the similar scan-based buffering is employed.

Because of large-scale integration of logical circuits and downsizing of a printhead, the latest printers employ a printhead in which a plurality of head units corresponding to respective colors are arrayed in a line in the print paper conveyance direction. In the printer employing such a printhead, the positions of dots, printed each time the printhead is scanned, are different for each color with respect to the print paper conveyance direction. Therefore, buffer memory management becomes complicated in the aforementioned scan-based buffering. In view of this, complications buffer memories having different sizes are provided for each of the colors, and a method (hereinafter referred to as "scroll buffering") where a buffer controller scrolls the buffer memories corresponding to each color is employed.

However, the scan-based buffering is limited in terms of its application depending on the type of the printhead as described above. For instance, the scanbased buffering is difficult to apply to a printhead whose plural head units corresponding to respective colors are arrayed a in line in the print paper conveyance direction. Meanwhile, in the scroll buffering, since buffers are fixedly provided for respective colors, for instance, in a case where image printing is performed by using black only, buffers provided for other colors are wasted. Thus, it raises a problem of inefficient usage of buffer memories.

Furthermore, multi-pass printing for printing an image by scanning a printhead for the same area plural times has a disadvantage of complicated control. Moreover, since the conveyance amount of the print medium must be constant for each scan of the printhead, the print speed cannot be increased.

SUMMARY OF THE INVENTION

The present invention is made in consideration of the above situation, and has as its object to provide a printing apparatus and a print control method which can efficiently utilize a buffer memory.

According to one aspect of the present invention, the foregoing object is attained by providing a print control method for performing a print operation by controlling a scan operation of a color printhead and a plurality of buffer memories where color image data is temporarily stored in units of each color component, comprising: an input step of inputting color component data to the plurality of buffer memories; a monitoring step of monitoring data storage with respect to the plurality of memories; a discriminating step of discriminating whether or not at least one of the plurality of buffer memories has become full based on a monitoring result in the monitoring step; a determining step of dynamically determining a print width, a conveyance amount of a print medium, and color component data to be cleared upon printing, based on a printable width of the color printhead and contents of the inputted color component data; a printing step of performing printing on the print medium by scanning the color printhead based on a discrimination result in the discriminating step and the print width determined in the determining step; a conveying step of conveying the print medium for the conveyance amount determined in the determining step; and a releasing step of clearing the color component data, determined in the determining step, from the plurality of buffer memories.

Furthermore, in a case where the print operation is performed by multi-pass printing, where printing is executed by scanning the color printhead plural times for the same area on the print medium, the discriminating step discriminates whether or not data storage with respect to each of the plurality of buffer memories has reached a predetermined amount, and the determining step determines the conveyance amount and color component data to be cleared, taking into account a number of times of scan of the color printhead for the same area.

According to another aspect of the present invention, the foregoing object is attained by providing a printing apparatus for performing a print operation by controlling a scan operation of a color printhead and a plurality of buffer memories where color image data is temporarily stored in units of each color component, comprising: input means for inputting color component data to the plurality of buffer memories; monitoring means for monitoring data storage with respect to the plurality of memories; discriminating means for discriminating whether or not at least one of the plurality of buffer memories has become full based on a monitoring result by the monitoring means; determining means for dynamically determining a print width, a conveyance amount of a print medium, and color component data to be cleared upon printing, based on a printable width of the color printhead and contents of the inputted color component data; printing means for performing printing on the print medium by scanning the color printhead based on a discrimination result of the discriminating means and the print width determined by the determining means; conveying means for conveying the print medium for the conveyance amount determined by the determining means; and releasing means for clearing the color component data, determined by the determining means, from the plurality of buffer memories.

Herein, in a case where the print operation is performed by multi-pass printing, and where printing is executed by scanning the color printhead plural times for the same area on the print medium, the discriminating means discriminates whether or not data storage with respect to each of the plurality of buffer memories has reached a predetermined amount, and the determining means determines the conveyance amount and color component data to be cleared, taking into account a number of times of scan of the color printhead for the same area.

According to an aspect of the present invention, the color image data is density data comprising black component data, cyan component data, magenta component data and yellow component data, the plurality of buffer memories includes a first buffer for storing the black component data, a second buffer for storing the cyan component data, a third buffer for storing the magenta component data, and a fourth buffer for storing the yellow component data, and the color printhead includes a first head unit for performing printing in black ink, a second head unit for performing printing in cyan ink, a third head unit for performing printing in magenta ink, and a fourth head unit for performing printing in yellow ink, each performing printing in correspondence with each component data of the density data stored in the first, second, third and fourth buffers, respectively.

For a configuration of the color printhead, it is preferable that a ratio of a print width with respect to the first head unit to the second, third and fourth head units is 3:1, and an array of ink discharge nozzles which discharge ink from each of the first, second, third and fourth head units is arranged in a print medium conveyance direction.

Furthermore, it is preferable that the first, second, third and fourth head units are arranged in a color printhead scanning direction, and a ratio of a capacity with respect to the first buffer to the second, third and fourth buffers is 3:1. Alternatively, the second, third and fourth head units are arrayed a in line in the print medium conveyance direction, the first head unit and an assembly of the second, third and fourth head units are arranged in a color printhead scanning direction, and a ratio of the capacity with respect to the first, second, third and fourth buffers is 3:1:2:3.

According to an aspect of the present invention, it is preferable that the color printhead includes an ink-jet printhead which performs printing by discharging ink. In order to discharge ink by utilizing heat energy, the color printhead includes electrothermal transducers for generating heat energy to be applied to the ink.

Herein, the determining means make a determination as follows:

(1) In a case where the color component data inputted by the input means includes only black component data and multi-pass printing is not performed, the determining means determines a print width of the first head unit as the print width and the conveyance amount of the print medium, and determines to clear all black component data used in printing.

(2) In a case where the color component data inputted by the input means includes only black component data and multi-pass printing is performed, the determining means determines the print width, the conveyance amount of the print medium, and black component data to be cleared upon printing, based on the number of times of scan and the print width of the first head unit.

(3) In a case where the color component data inputted by the input means includes all color component data and multi-pass printing is not performed, the determining means determines a print width of the second, third and fourth head units as the print width and the conveyance amount of the print medium, and determines to clear all the color component data used in printing.

(4) In a case where the color component data inputted by the input means includes all color component data and multi-pass printing is performed, the determining means determines the print width, the conveyance amount of the print medium, and density data to be cleared upon printing, based on the number of times of scan and the print width of the second, third and fourth head units.

Herein, each of the plurality of buffer memories comprises a plurality of blocks for storing color component data necessary for each printing element of the color printhead to perform printing by a single scan of the color printhead, and the plurality of blocks are hierarchically distinguishable from a lowest block to a highest block.

The input means inputs the color component data to the lowest block of the buffer memories having the above configuration.

Each time the color component data inputted by the input means fills the lowest block, the color component data is shifted block by block to a higher block.

In accordance with the present invention as described above, when a print operation is performed by controlling the scanning of a color printhead and a plurality of buffer memories which temporarily store color image data in units of color components, color component data is inputted to the buffer memories while monitoring data storage with respect to the plurality of buffer memories. Based on the monitoring result, it is discriminated whether or not at least one of the plurality of buffer memories has become full, while a print width, a conveyance amount of a print medium, and color component data to be cleared upon printing are dynamically determined based on the printable width of the color printhead and the contents of the inputted color component data.

Based on the above discrimination result and the determined print width, printing is performed on the print medium by scanning the color printhead. The print medium is conveyed for the determined conveyance amount, and the determined color component data is cleared from the plurality of buffer memories.

Furthermore, in a case of performing the above print operation by multi-pass printing, in which the color printhead is scanned plural times for the same area of the print medium, it is further determined as to whether or not the data storage with respect to each of the plurality of buffer memories has reached a predetermined amount, and the conveyance amount of the print medium and color component data to be cleared are also determined, taking into account the number of times of scanning the color printhead for printing the same area.

The present invention is particularly advantageous since buffer memories can be efficiently utilized. The present invention achieves this advantage by:
dynamically determining a print width, a conveyance amount of a print medium, and color component data to be cleared from the buffer memories upon printing, based on the printable width of the color printhead and the contents of inputted color component data; performing printing on the print medium by scanning the color printhead based on the discriminated storage state of the buffer memories and determined print width; conveying the print medium for the determined conveyance amount; and clearing the determined color component data from the plurality of buffer memories.

Furthermore, in the case of performing multi-pass printing, discrimination is made as to whether or not data storage with respect to each of the plurality of buffer memories has reached a predetermined amount, and the conveyance amount of the print medium as well as color component data to be cleared are determined taking into account the number of times of scanning the color printhead for printing the same area. Accordingly, the buffer memories can also be efficiently utilized in multi-pass printing.

Still further, the present invention provides an advantage of employing the common print control method since the same print control can be used, regardless of color image printing or monochrome image printing, without depending on the different configuration of the printhead.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
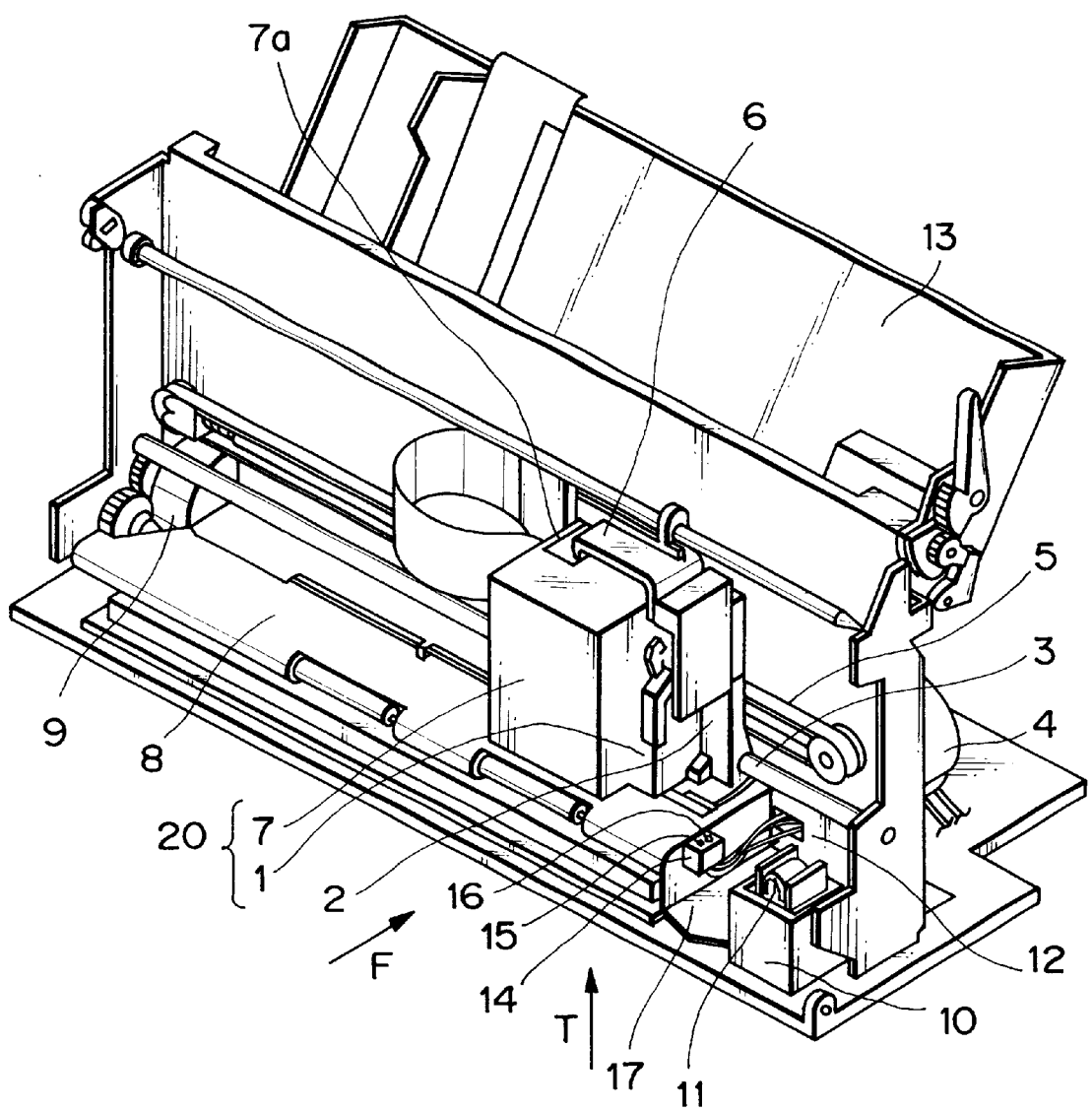
FIG. 1 is a perspective view showing an overall construction of a printing apparatus, as a typical embodiment of the present invention, which comprises a printhead for performing printing in accordance with an ink-jet printing method.

FIG. 1 is a perspective view showing an overall construction of a printing apparatus, as a typical embodiment of the present invention, which comprises a printhead for performing printing in accordance with an ink-jet printing method.

In the present embodiment, a printhead 1 and an ink tank 7 for supplying ink to the printhead 1 integrally construct an ink cartridge 20 as shown in FIG. 1.

In FIG. 1, the printhead 1 is mounted to a carriage 2 such that ink is discharged downward in the drawing. While the carriage 2 is moved along a guide 3, ink droplets are discharged to a print medium (not shown), e.g., print paper or the like, and an image is formed. Note that the reciprocal movement of the carriage 2 is achieved by rotation of a carriage motor 4 transmitted through a timing belt 5. The carriage 2 comprises an engagement latch 6 which engages with an engagement hole 7a of the ink tank so as to fix the ink tank 7 to the carriage 2. In this state, electric contacts of the carriage 2 connect to electric contacts of the printhead 1, thereby establishing the electric connection between the printing apparatus and printhead 1.

Upon completing a print operation for a single scan of the printhead 1, the print operation is suspended, and the print medium on a platen 8 is conveyed for a predetermined amount by driving of a conveyance motor 9. Then, a print operation for the next scan of the printhead 1 is performed while the carriage 2 is moved along the guide 3.

In the right side of the body of the printing apparatus, a recovery unit 10, which performs a recovery operation, is provided to maintain an excellent ink discharge state of the printhead 1. The recovery unit 10 includes a cap 11 for capping the printhead 1, a wiper 12 for wiping the discharge surface of the printhead 1, a suction pump (not shown) for sucking ink from ink discharge nozzles of the printhead 1, and the like.

The driving force of the conveyance motor 9 for conveying a print medium is transmitted to an automatic sheet feeder (ASF) 13 in addition to the print-medium conveyance mechanism.

Furthermore, next to the recovery unit 10, an optical unit 14, comprising an infrared light emitting diode (light emitting device) 15 and a phototransistor (photoreceptor) 16, is provided for detecting the amount of ink residue. The light emitting device 15 and photoreceptor 16 are situated next to each other in the print paper conveyance direction (arrow F). The optical unit 14 is attached to a chassis 17 of the body of the printing apparatus. When the ink cartridge 20 is attached to the carriage 2 and moved to the right from the position shown in FIG. 1, the ink cartridge 20 comes to a position above the optical unit 14. The ink state is detected from the bottom surface of the ink tank 7 by the optical unit 14.

Next, a structure for executing print control in the above described printing apparatus is described.

Figure 2:
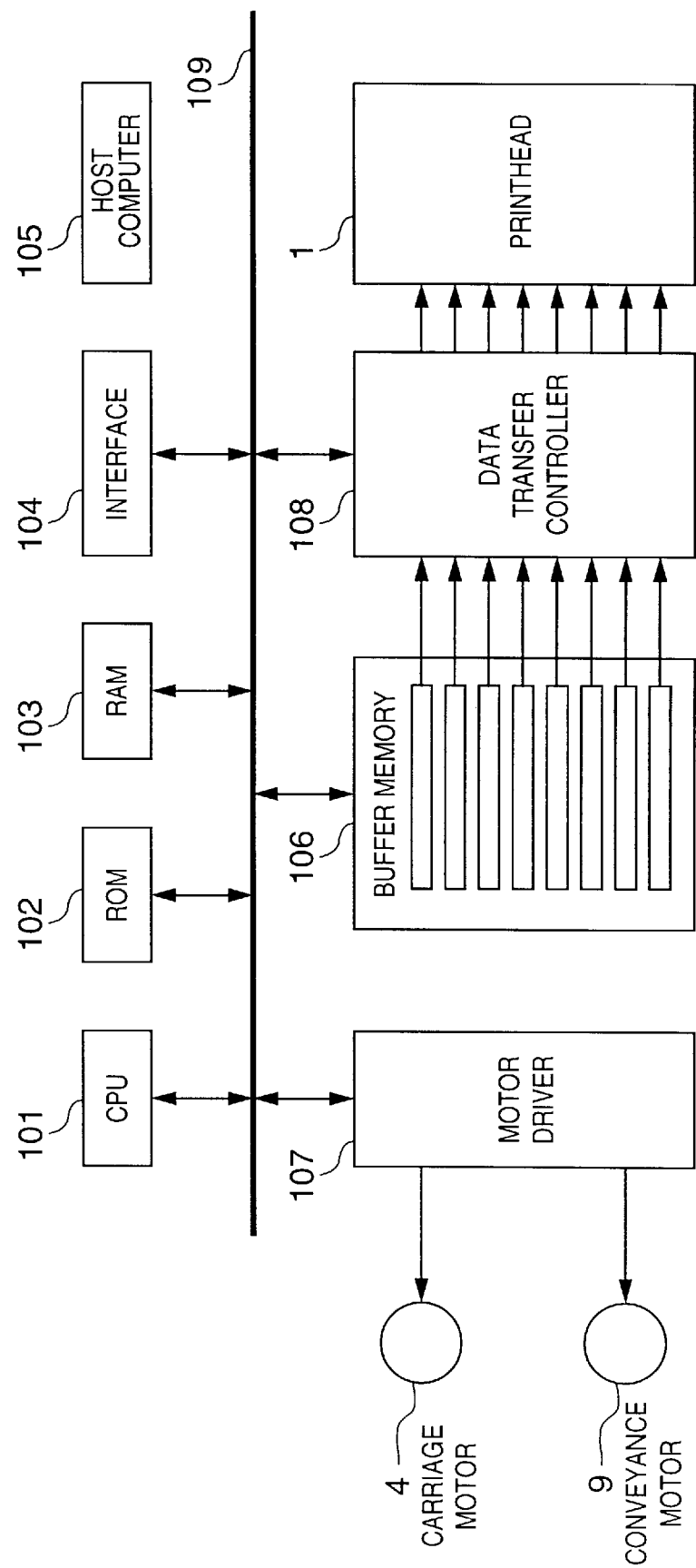
FIG. 2 is a block diagram showing a construction of a controller of the printing apparatus.

FIG. 2 is a block diagram showing a construction of a controller of the printing apparatus. In the controller in FIG. 2, a CPU 101 reads control programs stored in a ROM 102, executes the control programs while using a RAM 103 as a work area, and controls the print operation. The CPU 101 receives image data from a host computer 105 (hereinafter referred to as a host) connected through an interface 104, and generates bitmap data in a buffer memory 106. Upon generating bitmap data (hereinafter referred to as print data) corresponding to a single scan of the printhead 1, the CPU 1 controls the carriage motor 4 and conveyance motor 9 via a motor driver 107, and also appropriately controls a data transfer controller 108 to transfer the print data stored in the buffer memory 106 to the printhead 1, for printing an image on a print medium.

Note that reference numeral 109 in FIG. 2 denotes a CPU bus which connects each of the components.

Figure 3:
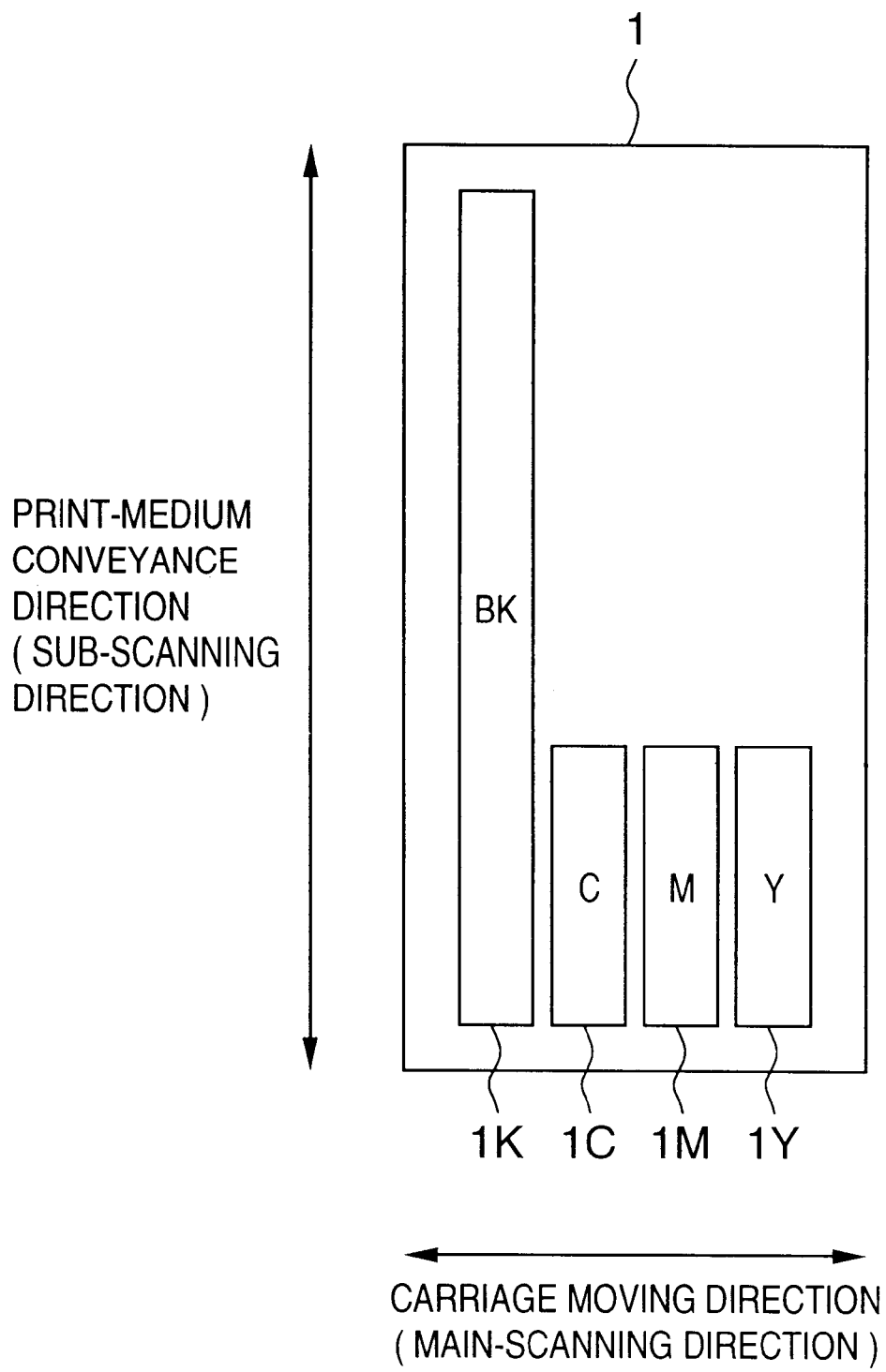
FIG. 3 is an explanatory view showing a nozzle configuration of a printhead 1.

FIG. 3 is an explanatory view showing a nozzle configuration of the printhead 1 according to the present embodiment. As shown in FIG. 3, the printhead 1 comprises nozzles 1K for discharging black ink (hereinafter referred to as black head), nozzles 1C for discharging cyan ink (hereinafter referred to as cyan head), nozzles 1M for discharging magenta ink (hereinafter referred to as magenta head), and nozzles 1Y for discharging yellow ink (hereinafter referred to as yellow head). These four heads are arranged in the carriage moving direction (main-scanning direction). The plurality of nozzles of each of the heads are arranged in the print medium conveyance direction (sub-scanning direction).

A ratio of a print width with respect to the black head 1K to the other three heads is 3:1. Thus, for instance, if the number of nozzles of the black head 1K is 72, the number of nozzles of each of the other three heads is 24.

By virtue of the above construction, in a case of printing a monochrome image by using the black head 1K only, printing speed can be increased.

In order to simplify the following description, it is assumed herein that the number of nozzles of the black head 1K is 12, and the number of nozzles of each of the other three heads is 4.

Figure 4:
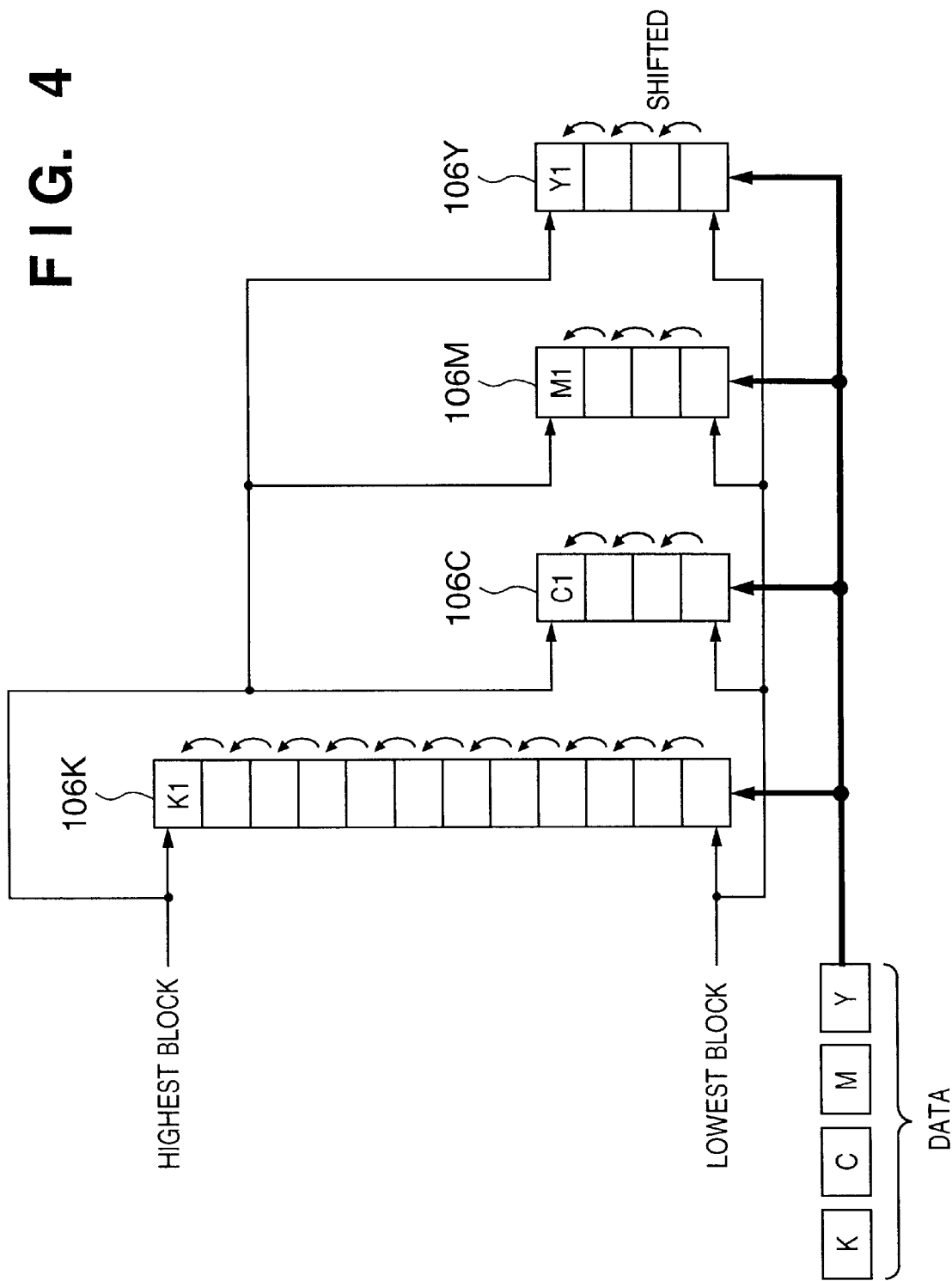
FIG. 4 is an explanatory view of buffer memories applied to the printhead having the configuration shown in FIG. 3.

FIG. 4 is an explanatory view of buffer memories applied to the printhead having the configuration shown in FIG. 3. As shown in FIG. 4, the size of each buffer memory corresponds to a print width of each head. The four buffer memories respectively store K (black) data, C (cyan) data, M (magenta) data, and Y (yellow) data. Each of these buffer memories can store data corresponding to a single scan of the printhead 1. More specifically, a buffer memory 106K corresponding to the black head 1K can store the maximum of 12 lines of K data, a buffer memory 106C corresponding to the cyan head 1C can store the maximum of 4 lines of C data, a buffer memory 106M corresponding to the magenta head 1M can store the maximum of 4 lines of M data, and a buffer memory 106Y corresponding to the yellow head 1Y can store the maximum of 4 lines of Y data. If K, C, M, and Y data are inputted line by line, the inputted data is first stored in the lowest block of the respective buffer memories as shown in FIG. 4. When the next line of data is inputted, the data already stored in the buffer memories are shifted by one block, storing the newest data always in the lowest block.

Moreover, to determine the "full" state of the buffer memories, in which data is stored in each of the buffer memories to its maximum capacity, determining sections (K1, C1, M1, and Y1) are provided in the highest block of each buffer memory as shown in FIG. 4.

Next, buffer memory control executed in the printing apparatus having the above-described construction will be described with reference to FIGS. 5 to 8. Note that herein, description will be provided based on an assumption that printing is performed on a page of print paper. Also assume that the contents in the data buffers are all cleared before starting the print operation.

Figure 5:
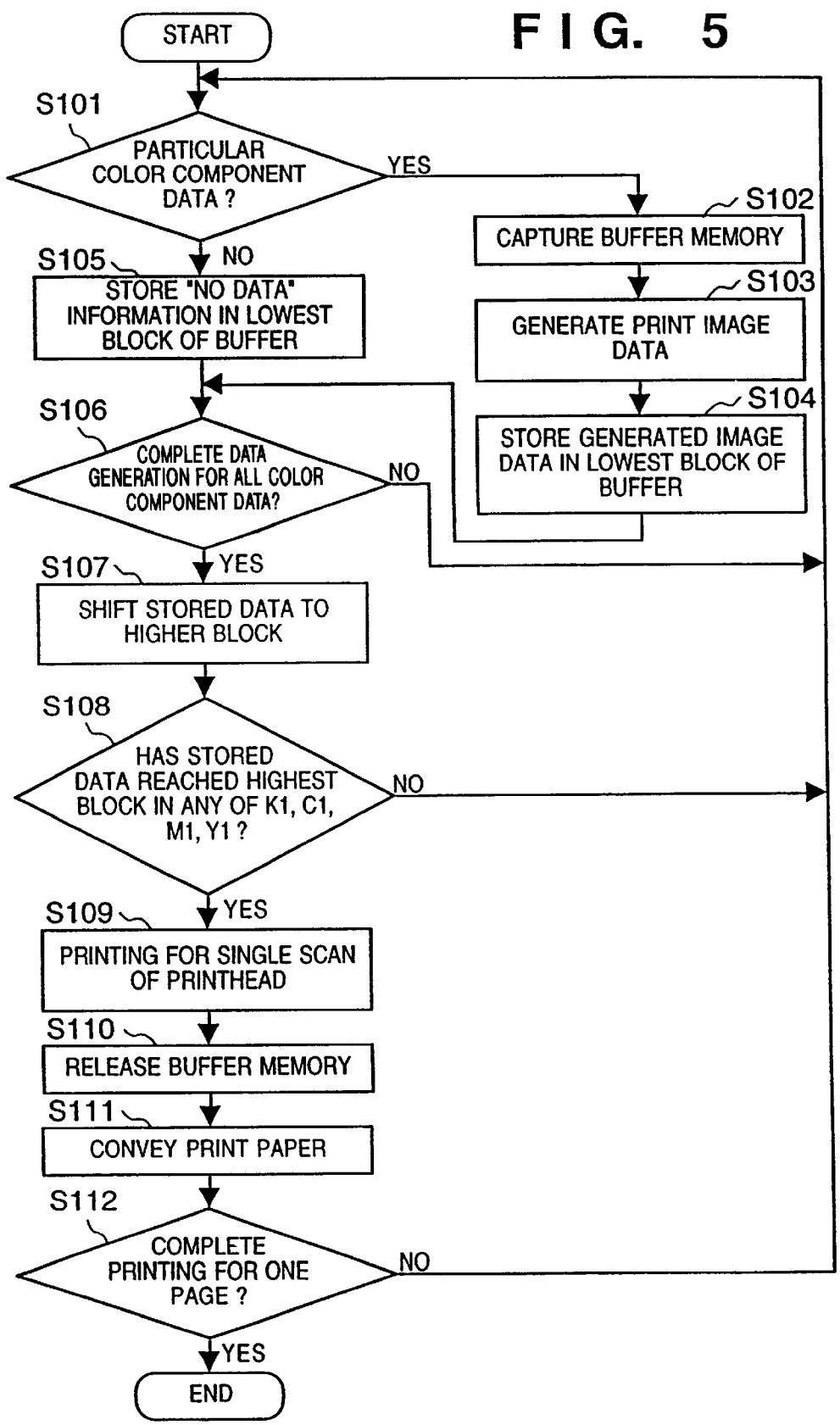
FIG. 5 is a flowchart showing a buffer control process.
Figure 6:
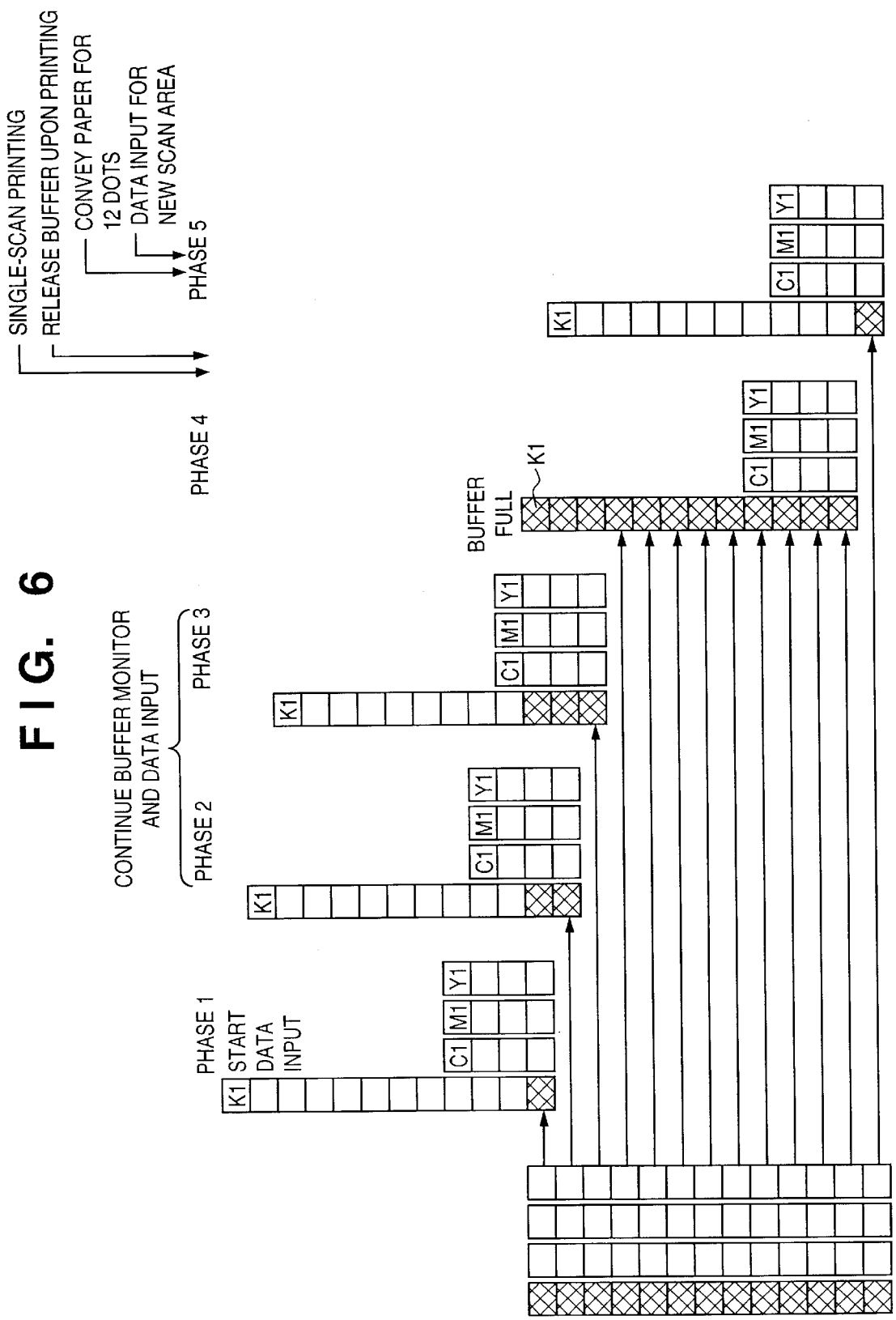
FIG. 6 is an explanatory view showing the transition of an internal state in data buffers in a case of printing a monochrome image.
Figure 7:
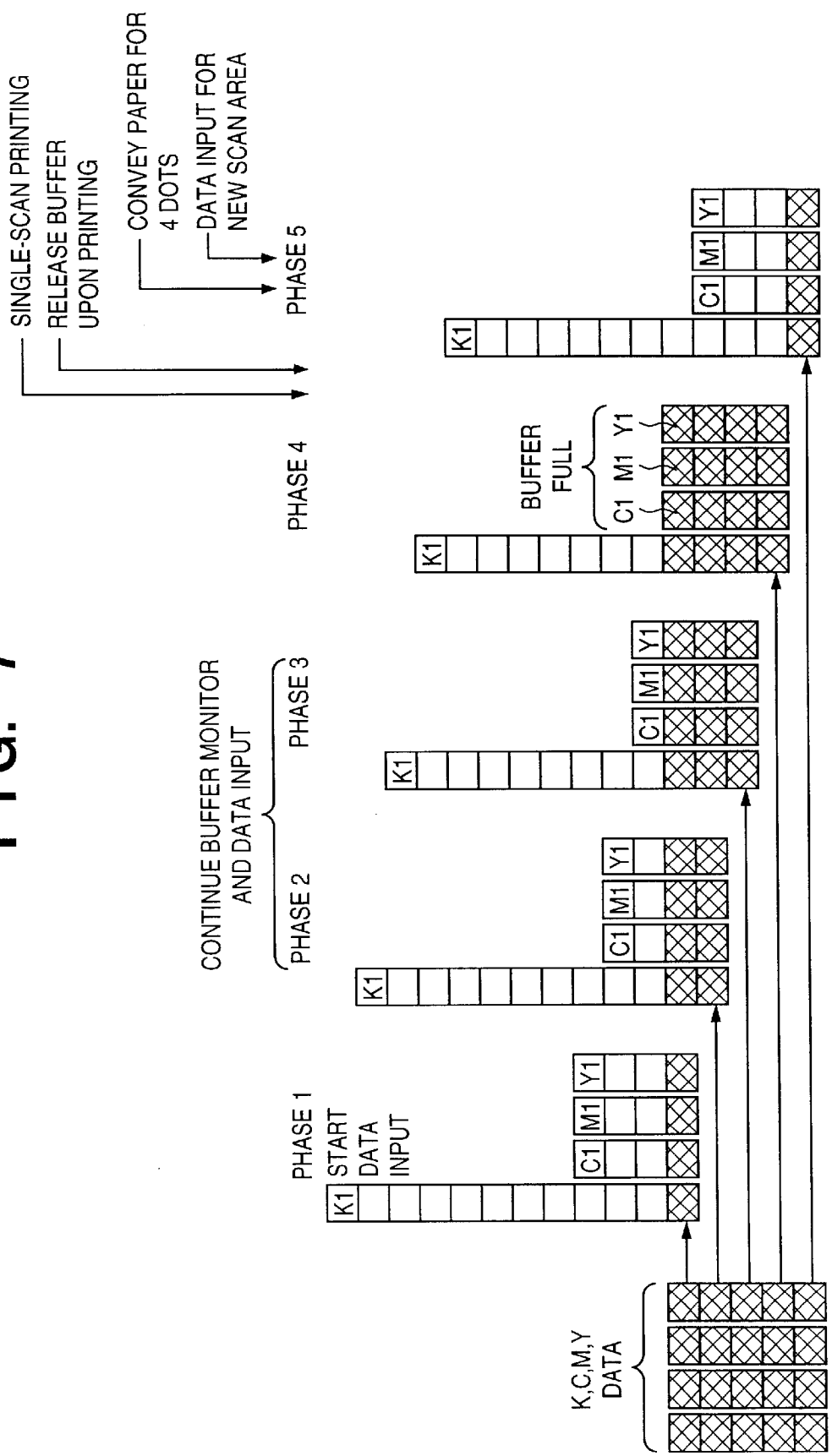
FIG. 7 is an explanatory view showing the transition of an internal state in the data buffers in a case of printing a color image.
Figure 8:
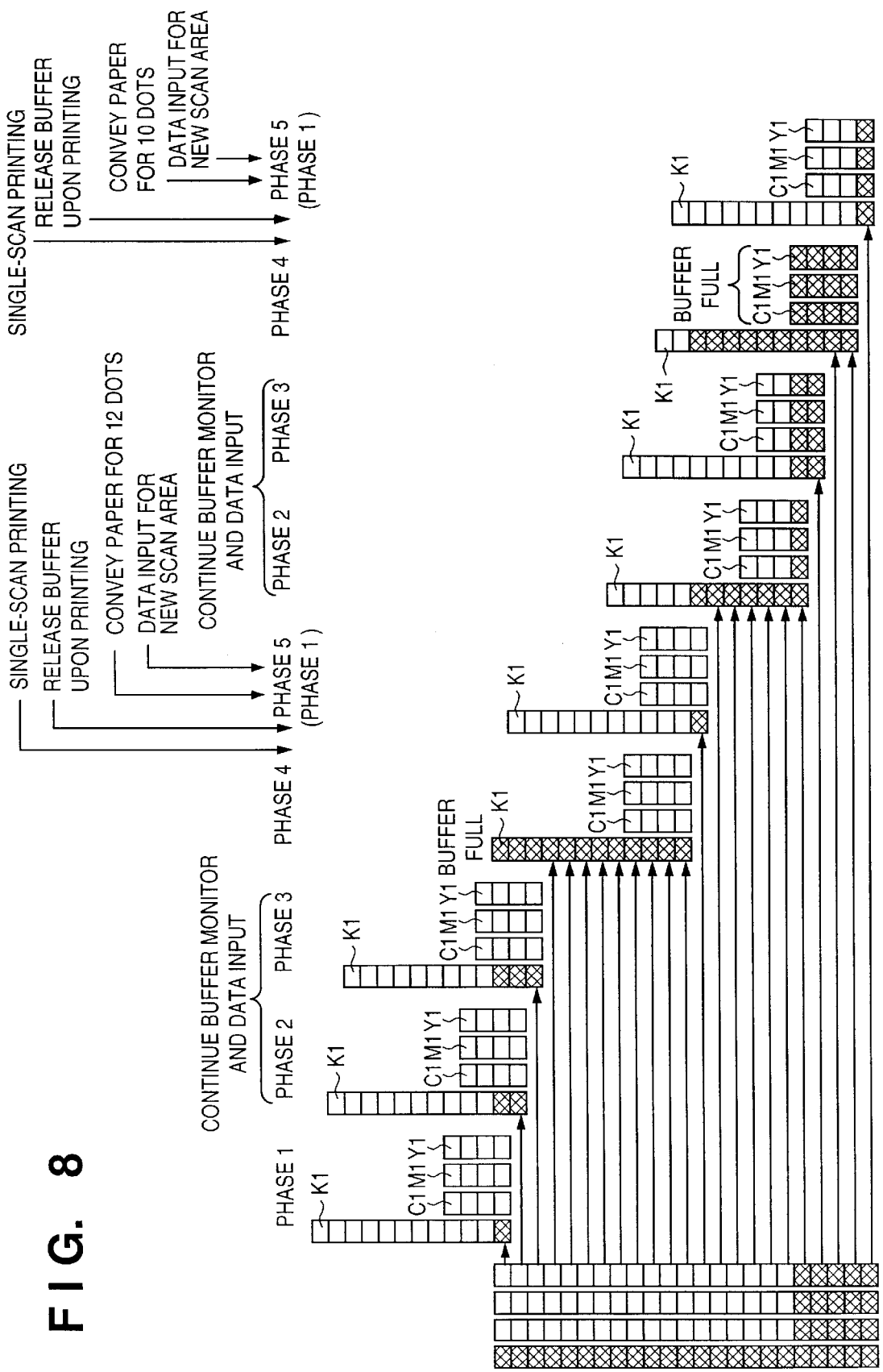
FIG. 8 is an explanatory view showing the transition of an internal state in the data buffers in a case of printing an image containing both color and monochrome images.

FIG. 5 is a flowchart showing a buffer control process. FIG. 6 is an explanatory view showing the transition of an internal state in the data buffers in a case of printing a monochrome image (only K data is inputted and only the black head 1K is used). FIG. 7 is an explanatory view showing the transition of an internal state in the data buffers in a case of printing a color image (K, C, M, and Y data are inputted and all four heads are used). FIG. 8 is an explanatory view showing the transition of an internal state in the data buffers in a case of printing an image containing both color and monochrome images. In FIGS. 6 to 8, a meshed block indicates a block where a buffer memory is allocated and image data is stored, and a white block indicates a block where a buffer memory is not allocated and image data is not stored.

In step S101, the CPU 101 judges whether or not the inputted data includes data of a particular color component. For instance, the CPU 101 first judges whether or not there is K data, then C data, then M data, and Y data. If the CPU 101 judges that there is, e.g., K data, the process proceeds to step S102 where the buffer memory 106K is captured. In step S103, image data for printing one line is generated in the work area of the RAM 103. In step S104, the generated one line of image data is stored in the lowest block of the buffer memory 106K. Then, the process proceeds to step S106.

Meanwhile, if the CPU 101 judges in step S101 that the data does not include the particular color component, the process proceeds to step S105 and sets information indicative of "no data" in the lowest block of the corresponding buffer memory. Then, the process proceeds to step S106.

In step S106, it is judged whether or not the image data generation for one line has been completed for all the color component data. If it is judged herein that the image data generation has not been completed, the process returns to step S101 to repeat the above-described process for other color component data. In the foregoing manner, data for one line is stored in the buffer memories.

In this stage, the buffer memories have a state indicated as phase 1 in FIG. 6 in a case of monochrome image printing, or have a state indicated as phase 1 in FIG. 7 in a case of color image printing, or have a state indicated as phase 1 in FIG. 8 in a case of a mixture of monochrome and color image printing.

Meanwhile, if it is judged in step S106 that the image data generation for one line has been completed for all color component data, the process proceeds to step S107, where the image data stored in the block is shifted by one block toward the higher blocks. In step S108, it is further judged whether or not any one of the stored color component data has reached the highest block in the buffer memories. The judgment is made by using the determining section provided in the highest block of each buffer memory.

If it is judged in step S108 that none of the color component data has reached the highest block, the process returns to step S101 to continue storing image data of the next line. This step of continuously storing the image data corresponds to a state before image data storing reaches the highest block, i.e., the state where each line of image data is still sequentially stored in the buffer memories. In this stage, the buffer memories have a state indicated as phases 2 and 3 in FIG. 6 in a case of monochrome image printing, or have a state indicated as phases 2 and 3 in FIG. 7 in a case of color image printing, or have a state indicated as phases 2 and 3 in FIG. 8 in a case of mixture of a monochrome and color image printing.

Meanwhile, if it is judged in step S108 that one of the color component data has reached the highest block, the process proceeds to step S109 where the image data stored in the buffer memory is outputted to the data transfer controller 108, the carriage motor 4 is driven to move the printhead 1, and printing for a single scan of the printhead is performed. Upon completing the print operation, the block in the buffer memory, where image data used for the print operation has been stored, is released in step S110.

Referring again to the internal state of the buffer memories, when one of the color component data has reached the highest block, the buffer memories have a state indicated as phase 4 in FIG. 6 in a case of monochrome image printing, or have a state indicated as phase 4 in FIG. 7 in a case of color image printing, or have a state indicated as phase 4 in FIG. 8 in a case of a mixture of monochrome and color image printing.

With respect to the print width of a single scan of the printhead, in the case of monochrome image printing, the print width is the print width (12 dots) of the black head 1K; and in the case of color image printing, the print width is the print width (4 dots) of the cyan head 1C, magenta head 1M, or yellow head 1Y. Meanwhile, in the case of a mixture of monochrome and color image printing, 12 dots are the print width for the monochrome image area, but 4 to 12 dots are the print width (10 dots in FIG. 8) for an area transiting from a monochrome image to a color image.

In step S111, the print paper is conveyed for the length corresponding to the print width executed by the print operation in step S109.

In step S112, it is judged whether or not the print operation for one page of print paper has been completed. If it is judged that the print operation has not been completed, the process returns to step S101, while if it is judged that the print operation has been completed, the process ends.

Herein, for instance, if the print operation is to be continued, the process returns to step S101 while the print paper is conveyed in step S111, and the buffer memories have a state indicated as phase 5 in FIGS. 6 to 8.

In other words, regardless of monochrome image printing, color image printing, or a mixture of monochrome and color image printing, the print control related to buffer memories is basically the repetition of the following phases.

(1) Phase 1

Clear buffer memory and start inputting data (2) Phases 2 to 3

Continue data input, shift data toward higher blocks, and monitor vacancy in buffer memories (3) Phase 4

Confirm at least one "full" buffer memory, print a single scan of the printhead, and release the buffer memory (4) Phase 5 (phase 1)

Convey print paper for a print width of single scan, and input next data

[Modification]

The foregoing control according to the present embodiment is also applicable to a printhead having a nozzle-array configuration other than that shown in FIG. 3.

Figure 9:
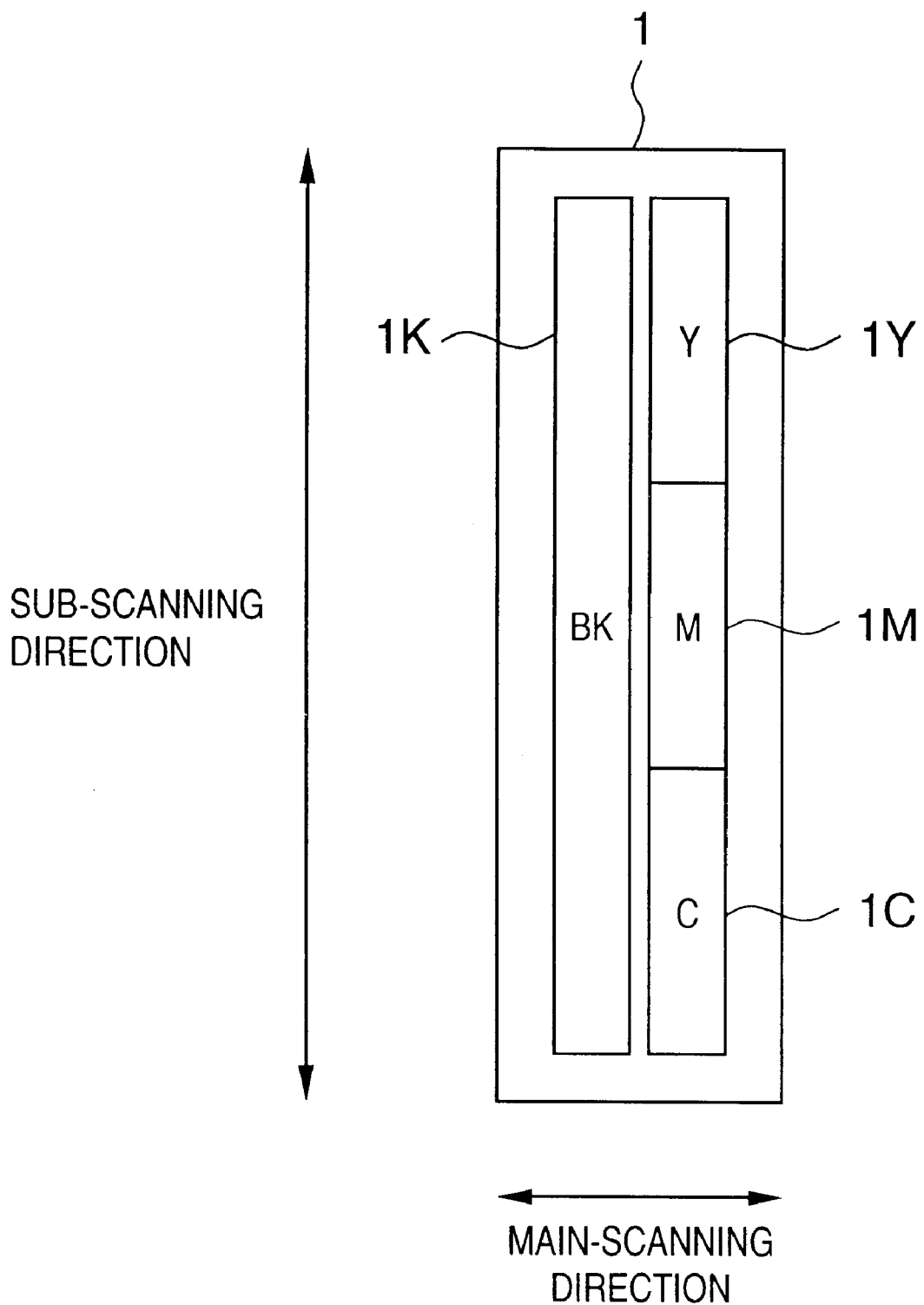
FIG. 9 is an explanatory view showing a nozzle configuration of the printhead 1 according to the modified embodiment of the present invention.

FIG. 9 is an explanatory view showing a nozzle configuration of the printhead 1 according to the modified embodiment of the present invention. Similar to the printhead 1 shown in FIG. 3, the printhead 1 in the modified example comprises the black head 1K, cyan head 1C, magenta head 1M, and yellow head 1Y, and a ratio of a print width with respect to the black head 1K to the other three heads is 3:1. However, the cyan head 1C, magenta head 1M, and yellow head 1Y are arrayed in a line in the sub-scanning direction as shown in FIG. 9. The arrayed three heads and the black head 1K are arranged in the main scanning direction.

In order to simplify the following description, it is assumed herein that the number of nozzles of the black head 1K is 12, and the number of nozzles of each of the other three heads is 4.

Figure 10:
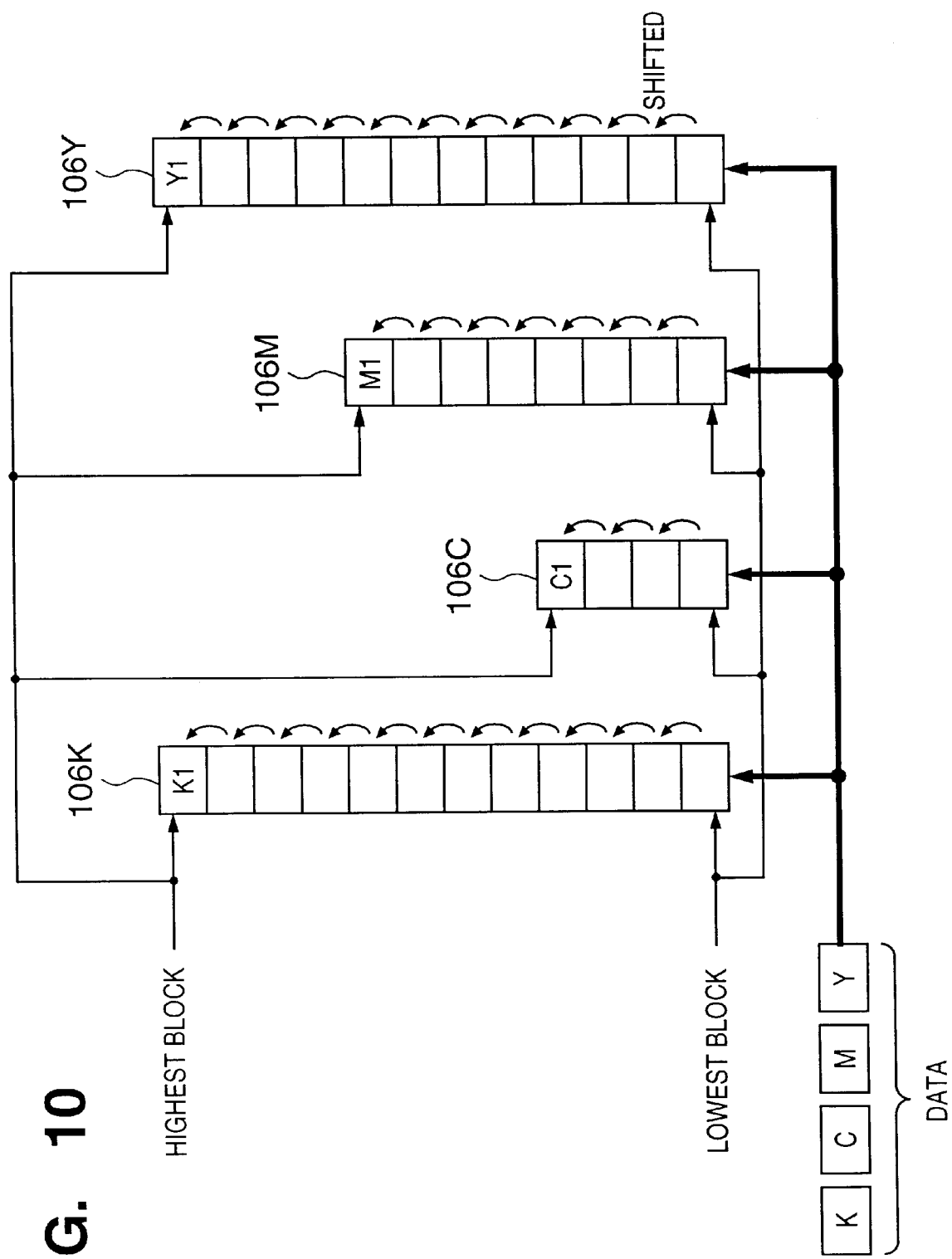
FIG. 10 is an explanatory view of buffer memories applied to the printhead having the configuration shown in FIG. 9.

FIG. 10 is an explanatory view of buffer memories applied to the printhead having the configuration shown in FIG. 9. As shown in FIG. 9, the size of each buffer memory corresponds to a print width of each head. The four buffer memories respectively store K (black) data, C (cyan) data, M (magenta) data, and Y (yellow) data. A buffer memory (K buffer) 106K corresponding to the black head 1K can store the maximum of 12 lines of K data, a buffer memory (C buffer) 106C corresponding to the cyan head 1C can store the maximum of 4 lines of C data, a buffer memory (M buffer) 106M corresponding to the magenta head 1M can store the maximum of 8 lines of M data, and a buffer memory (Y buffer) 106Y corresponding to the yellow head 1Y can store the maximum of 12 lines of Y data. If K, C, M, and Y data are inputted line by line, the inputted data is first stored in the lowest block of the respective buffer memories as shown in FIG. 10. When the next line of data is inputted, the data already stored in the buffer memories are shifted upward by one block, storing the newest data always in the lowest block.

Moreover, to determine the "full" state of the buffer memories, in which data is stored in each of the buffer memories to its maximum capacity, determining sections (K1, C1, M1, and Y1) are provided in the highest block of each buffer memory as shown in FIG. 10.

Figure 11:
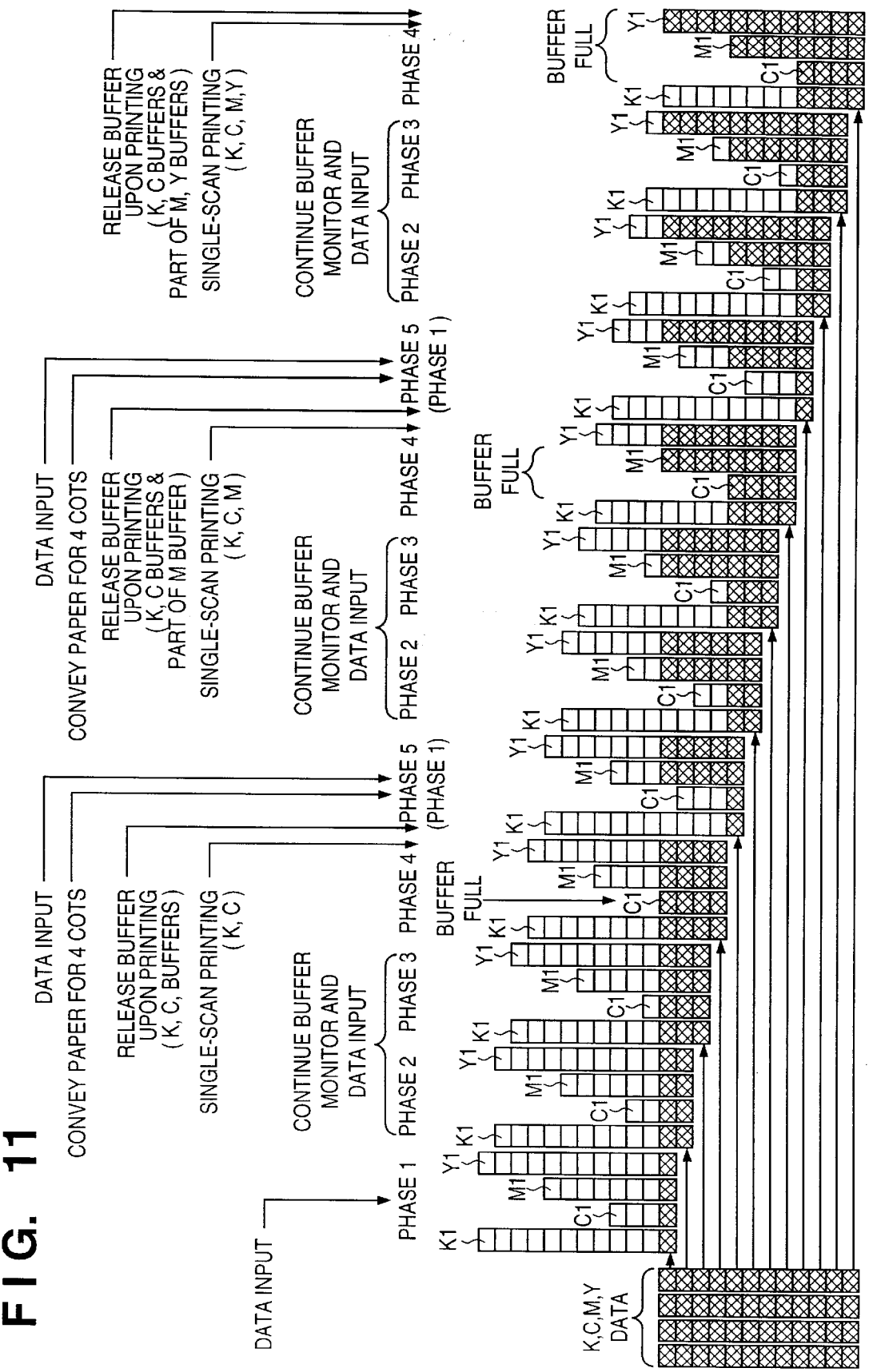
FIG. 11 is an explanatory view showing the transition of an internal state in data buffers in a case where K, C, M and Y data are inputted to the buffer memories having a configuration shown in FIG. 10 in the printhead having the configuration shown in FIG. 9.

When K, C, M and Y data for printing a color image are inputted to the printhead and buffer memories having the above described configuration, the internal state of the data buffer changes as shown in FIG. 11.

More specifically, in phase 1, K, M, C and Y data is inputted; in phases 2 and 3, data input is continued and the state in the buffer memory is monitored; and in phase 4, when at least one "full" buffer memory is confirmed (in this case, C buffer), the printhead 1 is scanned a single time to perform printing for a print width of 4 dots with regard to K data and C data. Then, the K buffer and C buffer are released and the contents thereof are cleared. In phase 5 (phase 1), the print paper is conveyed for four dots, and new data is inputted. In this stage, since the contents of the M buffer and Y buffer are not cleared, new data is inputted while shifting the data toward the higher blocks.

Furthermore, in the next phases 2 to 3, data input and monitoring the internal state of buffer memories are continued. When at least one "full" buffer memory is confirmed (in this case, C buffer and M buffer), the printhead 1 is scanned a single time to perform printing for a print width of 4 dots with regard to K data, C data and M data. Then, the K buffer and C buffer are released and the contents thereof are cleared. In the M buffer, the top four blocks are released and the contents thereof are cleared. In phase 5 (phase 1), the print paper is conveyed for four dots, and new data is inputted. In this stage, since the contents of a part of the M buffer (lower four blocks) and the Y buffer are not cleared, new data is inputted while shifting the data toward the higher blocks.

Further, in the next phases 2 to 3, data input and monitoring of the internal state of the buffer memories are continued. When at least one "full" buffer memory is confirmed (in this case, C buffer, M buffer and Y buffer), the printhead 1 is scanned a single time to perform printing for a print width of 4 dots with regard to K data, C data, M data and Y data. Then, the K buffer and C buffer are released and the contents thereof are cleared. In the M buffer and Y buffer, the upper four blocks are released and the contents thereof are cleared.

In the similar manner, the print operation continues.

As set forth above, even in a case where the nozzle configuration of the printhead or the configuration of the buffer memories is are different, the foregoing modified embodiment can perform the print operation by adopting the above-described control of the buffer memories, using the same print control sequences as that shown in the flowchart in FIG. 5.

Note that, to print monochrome images by the foregoing modified embodiment, the same print control as that described in the aforementioned embodiment is employed.

According to the aforementioned embodiments of the present invention, it is possible to employ the common print control method related to buffer memories, without depending on the difference in the configuration of the nozzles of the the printhead or the configuration of buffer memories, or without depending on the types of printing images (monochrome image, color image, mixture of monochrome and color images).

Furthermore, in the case of monochrome image printing, the above embodiment of the present invention can efficiently utilize all the print width of the black head. Therefore, this results in attaining high speed printing.

[Other Embodiments]

Herein, description will be provided on buffer memory control in a case where an image is printed by multi-pass printing control with the use of the printhead 1 having the configuration shown in FIG. 9. Note that this embodiment employs two-pass printing in which image printing is completed by twice scanning the printhead for each image printing area.

Figure 12:
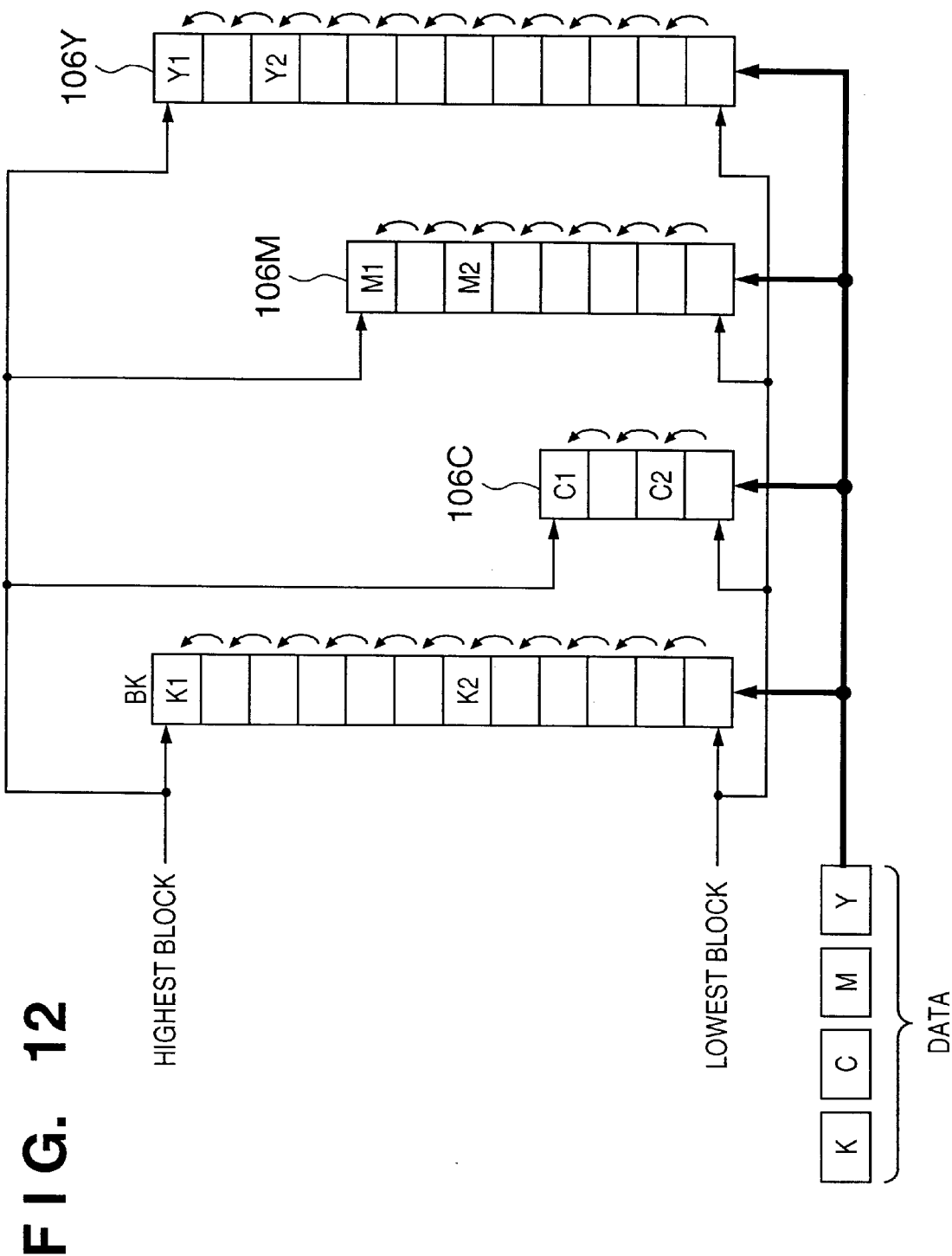
FIG. 12 is an explanatory view of buffer memories utilized to perform two-pass printing by the printhead having the configuration shown in FIG. 9.

FIG. 12 is an explanatory view of buffer memories utilized to perform two-pass printing by the printhead having the configuration shown in FIG. 9. The size and configuration of the buffer memories are basically the same as that shown in FIG. 10. While storing data in each of the buffer memories, in order to determine a predetermined storage state of the buffer memories, in which the two-pass printing is taken into account, determining sections (K1, K2, C1, C2, M1, M2, Y1 and Y2 in FIG. 12) are provided in the highest block and a predetermined block of each buffer memory as shown in FIG. 12. The determining sections K1, C1, M1 and Y1 determine whether or not image data is stored up to the highest block of each buffer memory, and the determining sections K2, C2, M2 and Y2 determine the remaining number of times of scan (NS) necessary to complete printing.

Next, buffer memory control executed by two-pass printing will be described with reference to FIGS. 13 to 15. Note that herein, description will be provided based on an assumption that printing is performed on a page of print paper. Also assume that the contents in the data buffers are all cleared before starting the print operation.

Figure 13:
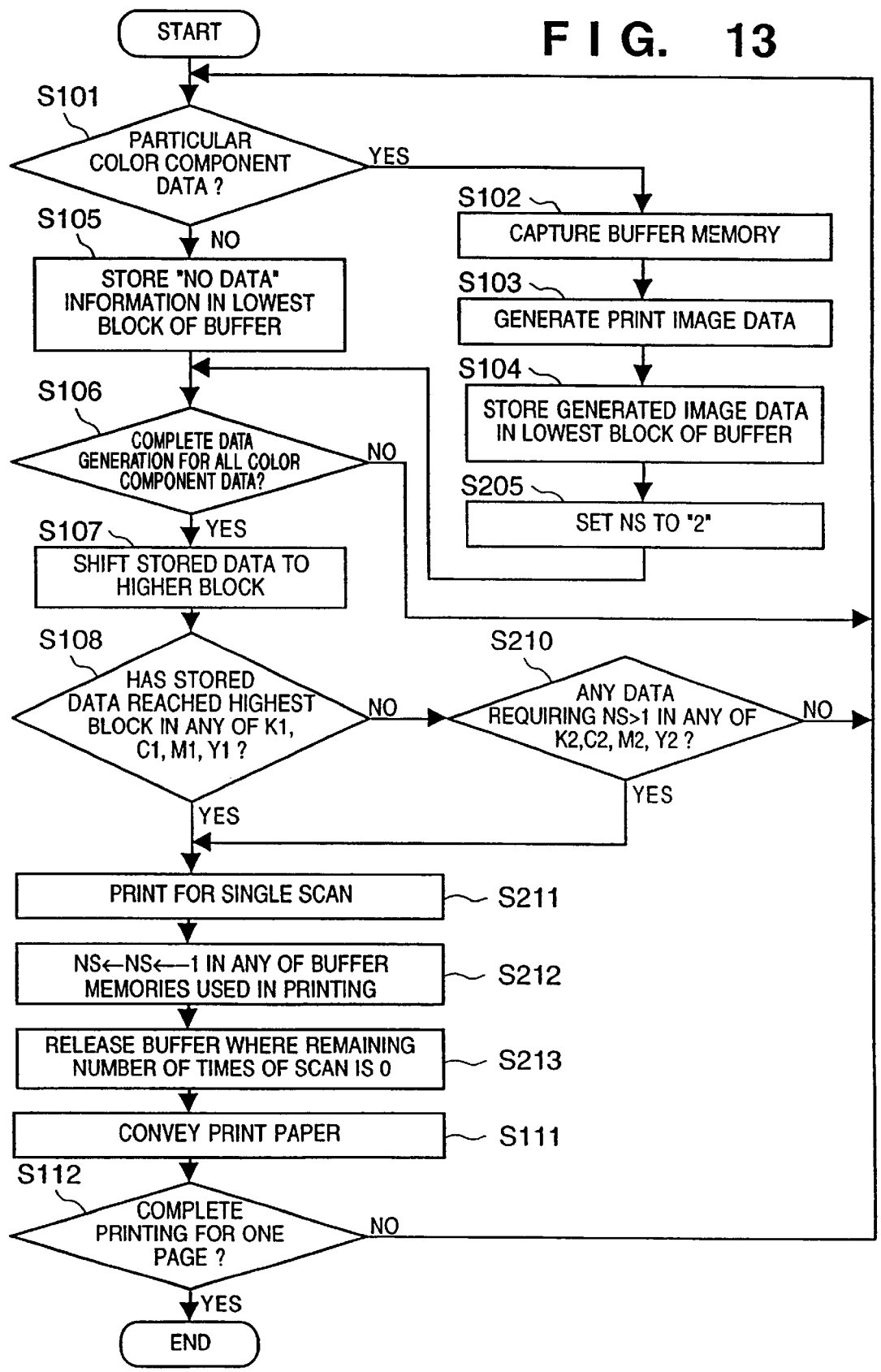
FIG. 13 is a flowchart showing a buffer control process in the two-pass printing.

FIG. 13 is a flowchart showing a buffer control process. FIG. 14 is an explanatory view showing the transition of an internal state in the data buffers in a case of printing a monochrome image (only K data is inputted and only the black head 1K is used). FIG. 15 is an explanatory view showing the transition of an internal state in the data buffers in a case of printing a color image (K, C, M, and Y data are inputted and all four heads are used).

Figure 14:
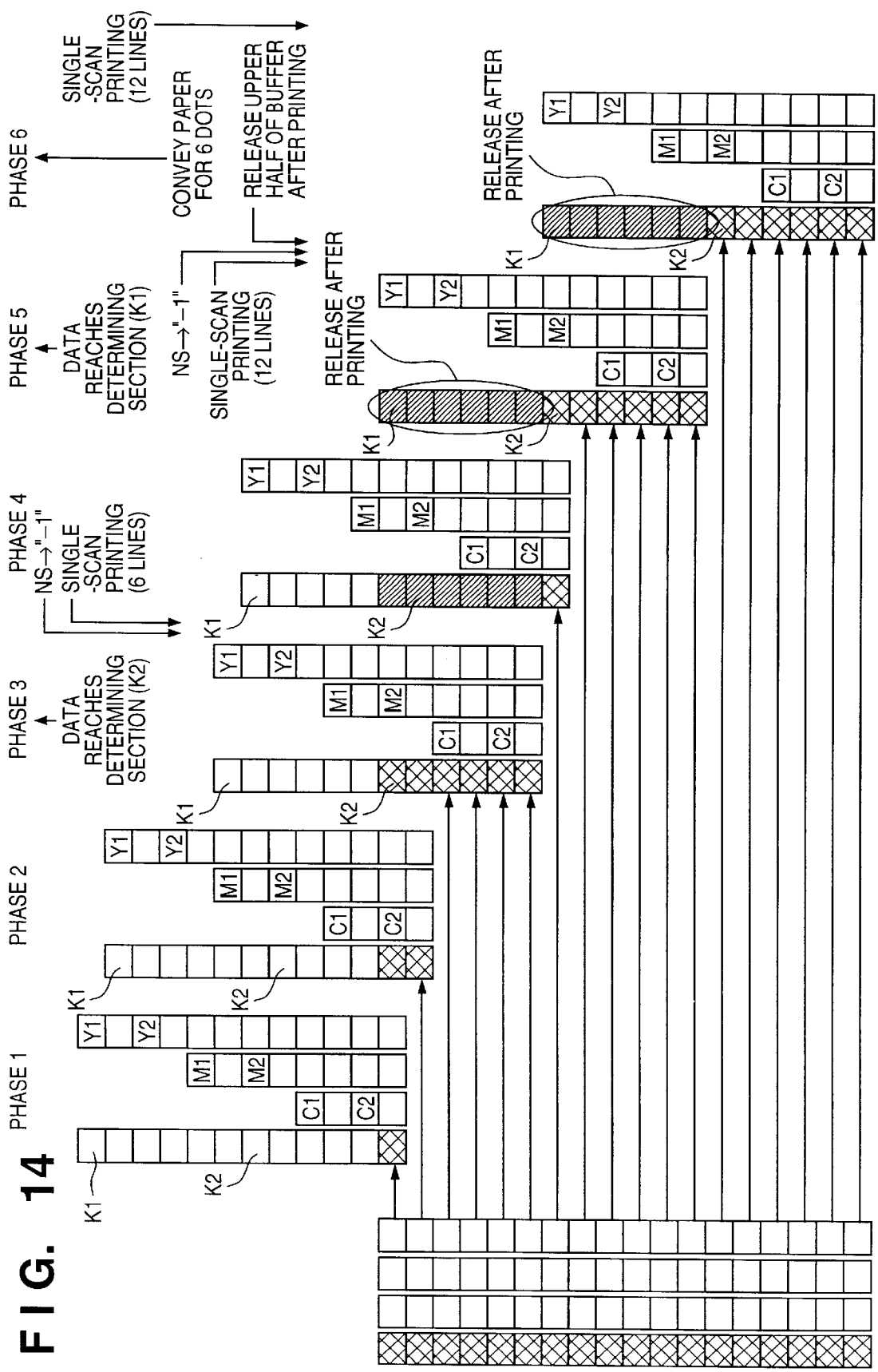
FIG. 14 is an explanatory view showing the transition of an internal state in the data buffers in a case of printing a monochrome image by the two-pass printing.
Figure 15:
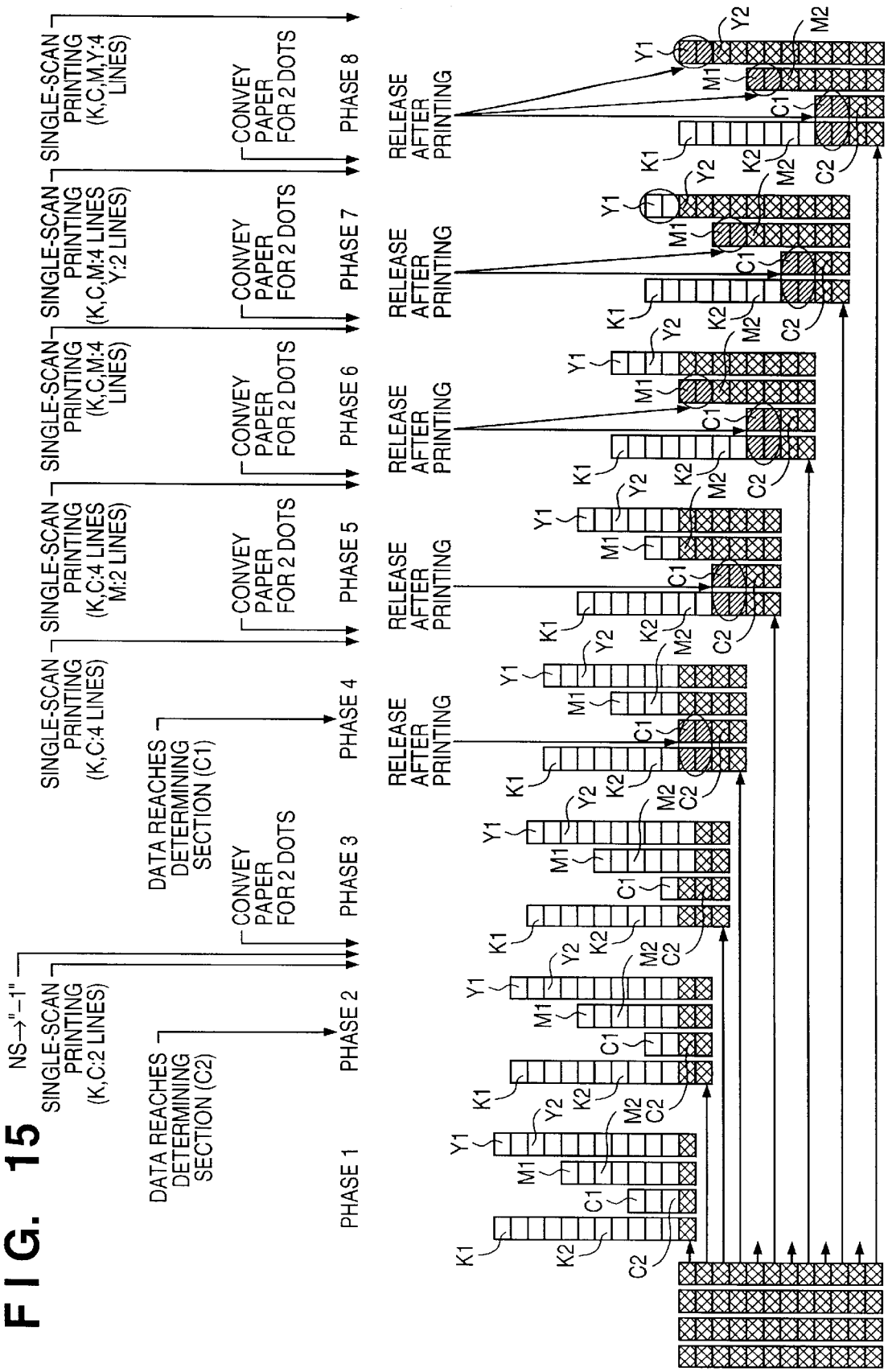
FIG. 15 is an explanatory view showing the transition of an internal state in the data buffers in a case of printing a color image by the two-pass printing.

In FIGS. 14 and 15, a meshed block indicates a block where a buffer memory is allocated, image data is stored, and the number of times of scan (NS) "2" is set; a hatched block indicates a block where the number of times of scan "1" is set; and a white block indicates a block where a buffer memory is not allocated and image data is not stored. Note that K1, K2, C1, C2, M1, M2, Y1 and Y2 are blocks where the determining sections are provided.

Note in the flowchart in FIG. 13, with regard to the process steps described in the above embodiment, the same step reference numerals are assigned and description thereof will not be provided herein.

Upon completing steps S101 to S104 in FIG. 13, in step S205, the CPU 101 sets the number of times of scan (NS) to "2" in the determining sections (K2, C2, M2 and Y2) so as to complete printing the image data which has been generated for a two-pass printing operation. Then, the process proceeds to step S106.

In step S106, it is judged whether or not the image data generation for one line has been completed for all the color component data. If it is judged herein that the image data generation has not been completed, the process returns to step S101 to repeat the above-described process for other color component data. In the foregoing manner, data for one line is stored in the buffer memories. In this stage, the buffer memories have a state indicated as phase 1 in FIG. 14 in a case of monochrome image printing, or have a state indicated as phase 1 in FIG. 15 in a case of color image printing.

Meanwhile, if it is judged in step S106 that the image data generation for one line has been completed for all color component data, the process in step S107 is executed, and in step S108, it is judged whether or not any one of the stored color component data has reached the highest block in the buffer memories. The judgment is made by using the determining section provided in the highest block of each buffer memory.

Herein, if it is judged in step S108 that none of the color component data has reached the highest block, the process proceeds to step S210 where judgment is made as to whether or not at least one of the color component data has reached the line position where the determining sections (K2, C2, M2 and Y2) are provided, and whether or not the number of times of scan (NS) is still set to "2" in the determining sections. Herein, if it is judged that the image data storing has not reached the line position, or even if the image data storing has reached the line position, if it is judged that the number of times of scan (NS) is set to "1" or "0", the process returns to step S101 to continue storing the next line of image data.

This step of continuously storing the image data corresponds to a state before image data storing reaches the highest block, i.e., the state where each line of image data is sequentially stored in the buffer memories. In this stage, the buffer memories have the state indicated as phases 1 and 2 in FIG. 14 in a case of monochrome image printing, or have the state indicated as phase 1 in FIG. 15 in a case of color image printing. Alternatively, the buffer memories have a state indicated as phase 4 in FIG. 14 where the first pass of the two-pass printing is completed and the number of times of scan (NS) is set to "1".

Meanwhile, if it is judged in step S108 that one of the color component data has reached the highest block, or if it is judged in step S210 that the image data storing has reached the determining sections (K2, C2, M2 and Y2) and the number of times of scan (NS) is set to "2", the process proceeds to step S211.

Referring herein to the internal state of the buffer memories, in a case of monochrome image printing, if the image data storing has reached the determining section (K2) and the number of times of scan (NS) is 2, the buffer memories have a state indicated as phase 3 in FIG. 14, while if the image data storing has reached the determining section (K1) in the highest block, the buffer memories have a state indicated as phase 5 and 6 in FIG. 14.

In a case of color image printing, if data storing of, e.g. cyan (C) data, has reached the determining section (C2) and the number of times of scan (NS) is "2", the buffer memories have a state indicated as phase 2 in FIG. 15, while if data storing of cyan (C) data has reached the determining section (C1) in the highest block, the buffer memories have a state indicated as phase 4 in FIG. 15.

In step S211, image data stored in the buffer memory is outputted to the data transfer controller 108, the carriage motor 4 is driven to move the printhead 1, and printing for a single scan of the printhead is performed. Upon completing the print operation, the number of times of scan (NS) of the buffer memory used in printing is decremented by 1 in step S212. Then in step S213, blocks are released in the buffer memory where the image data used in printing is stored and where the number of times of scan (NS) has become "0".

Herein referring again to the internal state of the buffer memories, in the stage where the number of times of scan (NS) has become "0" in the buffer memory, the buffer memories have the state indicated as phase 5 in FIG. 14 in a case of monochrome image printing, or have the state indicated as phase 4 in FIG. 15 in a case of color image printing. Upon completing the print operation, image data stored in the blocks circled by dotted ovals in FIGS. 14 and 15 is cleared, and the blocks are released.

Subsequently, in step S111, the print paper is conveyed for a predetermined amount. Note that since two-pass printing is performed in the present embodiment, the print paper is not conveyed after the first scan of the printhead in the page.

Then, the above processes are repeated until the print operation for one page is completed.

According to the above embodiment, even in the case of two-pass printing, each memory buffer is provided with a determining section for determining the state of image data storage and another determining section for determining the number of times of scan in addition to the data storage state, and print operation according to data input, buffer release, and timing of print paper conveyance are controlled. By virtue of this, it is possible to utilize the common print control method related to buffer memories, without depending on the types of image data, i.e., monochrome image data or color image data.

Furthermore, in the case of monochrome image printing, the foregoing embodiment of the present invention can efficiently utilize all the print width of the black head. Therefore, this results in attaining high speed printing.

Note that although the present embodiment has described two-pass printing as an example, the present invention is also applicable to multi-pass printing control adopting more than 3 passes by providing the determining sections for the number of times of passes.

In the above-described embodiment, it is assumed that data stored in a buffer memory is color component data or image data. However, this invention is not limited to this. For example, the data stored in the buffer memory may be density data indicating a density value of each color component.

Furthermore, in the foregoing embodiments, although the description has been provided based on the assumption that a droplet discharged by the printhead is ink and that the liquid contained in the ink tank is ink, the contents are not limited to ink. For instance, the ink tank may contain processing liquid or the like which is discharged to a print medium in order to improve the fixation or water repellent capability of the printed image or to improve the image quality.

Each of the embodiments described above comprises means (e.g., an electrothermal transducer, laser beam generator, and the like) for generating heat energy as energy utilized upon execution of ink discharge, and adopts the method which causes a change in the state of ink by the heat energy, among the ink-jet printing method. According to this printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of a so-called on-demand type and continuous type. Particularly, in the case of the on-demand type, the system is effective because, by applying at least one driving signal, which corresponds to printing information and gives a rapid temperature rise exceeding film boiling, to each of the electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region, is also included in the present invention. In addition, the present invention can be effectively applied to an arrangement based on Japanese Patent Laid-Open No. 59-123670, which discloses the arrangement using a slot common to a plurality of electrothermal transducers as a discharge portion of the electrothermal transducers, or Japanese Patent Laid-Open No. 59-138461, which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive ink from the apparatus main unit upon being mounted on the apparatus main unit, or a cartridge type printhead in which an ink tank is integrally arranged on the printhead itself, is applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a single color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ ink which is solid at room temperature or less, or ink which softens or liquefies at room temperature, or ink which liquefies upon application of a printing signal, since it is a general practice to perform temperature control of the ink itself within a range from 308C to 708C in the ink-jet system, so that the ink viscosity can fall within a stable discharge range.

In addition, in order to prevent a temperature rise caused by heat energy by positively utilizing it as energy for causing a change in the state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being are realized by executing the program codes which are read by a computer, the present invention includes a case where an OS (operating system) or the like working on the computer performs a part of or the entire process in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part of or the entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. A print control method for performing a print operation by controlling a scan operation of a color printhead and a plurality of buffer memories where color image data is temporarily stored in units of each color component, comprising:

an input step of inputting color component data to the plurality of buffer memories;

a monitoring step of monitoring data storage with respect to the plurality of memories;

a discriminating step of discriminating whether or not at least one of the plurality of buffer memories has become full based on a monitoring result in said monitoring step;

a determining step of dynamically determining a print width, a conveyance amount of a print medium, and color component data to be cleared upon printing, based on a printable width of the color printhead and contents of the inputted color component data;

a printing step of performing printing on the print medium by scanning the color printhead based on a discrimination result in said discriminating step and the print width determined in said determining step;

a conveying step of conveying the print medium for the conveyance amount determined in said determining step; and a releasing step of clearing the color component data, determined in said determining step, from the plurality of buffer memories.

2. The print control method according to claim 1, wherein in a case where the print operation is performed by multi-pass printing, where printing is executed by scanning the color printhead plural times for the same area on the print medium, said discriminating step discriminates whether or not data storage with respect to each of the plurality of buffer memories has reached a predetermined amount, and said determining step determines the conveyance amount and color component data to be cleared, taking into account a number of times of scan of the color printhead for the same area.

3. A printing apparatus for performing a print operation by controlling a scan operation of a color printhead and a plurality of buffer memories where color image data is temporarily stored in units of each color component, comprising:

input means for inputting color component data to the plurality of buffer memories;

monitoring means for monitoring data storage with respect to the plurality of memories;

discriminating means for discriminating whether or not at least one of the plurality of buffer memories has become full based on a monitoring result by said monitoring means;

determining means for dynamically determining a print width, a conveyance amount of a print medium, and color component data to be cleared upon printing, based on a printable width of the color printhead and contents of the inputted color component data;

printing means for performing printing on the print medium by scanning the color printhead based on a discrimination result of said discriminating means and the print width determined by said determining means;

conveying means for conveying the print medium for the conveyance amount determined by said determining means; and releasing means for clearing the color component data, determined by said determining means, from the plurality of buffer memories.

4. The printing apparatus according to claim 3, wherein in a case where the print operation is performed by multi-pass printing, where printing is executed by scanning the color printhead plural times for the same area on the print medium, said discriminating means discriminates whether or not data storage with respect to each of the plurality of buffer memories has reached a predetermined amount, and said determining means determines the conveyance amount and color component data to be cleared, taking into account a number of times of scan of the color printhead for the same area.

5. The printing apparatus according to claim 3, wherein the color image data is density data comprising black component data, cyan component data, magenta component data and yellow component data, the plurality of buffer memories include a first buffer for storing the black component data, a second buffer for storing the cyan component data, a third buffer for storing the magenta component data, and a fourth buffer for storing the yellow component data, and the color printhead includes a first head unit for performing printing in black ink, a second head unit for performing printing in cyan ink, a third head unit for performing printing in magenta ink, and a fourth head unit for performing printing in yellow ink, each performing printing in correspondence with each component data of the density data stored in the first, second, third and fourth buffers.

6. The printing apparatus according to claim 5, wherein a ratio of a print width with respect to the first head unit to the second, third and fourth head units is 3:1, and an array of ink discharge nozzles which discharge ink from each of the first, second, third and fourth head units is arranged in a print medium conveyance direction.

7. The printing apparatus according to claim 6, wherein the first, second, third and fourth head units are arranged in a color printhead scanning direction, and a ratio of a capacity with respect to the first buffer to the second, third and fourth buffers is 3:1.

8. The printing apparatus according to claim 6, wherein the second, third and fourth head units are arrayed in line in the print medium conveyance direction, the first head unit and an assembly of the second, third and fourth head units are arranged in a color printhead scanning direction, and a ratio of the capacity with respect to the first, second, third and fourth buffers is 3:1:2:3.

9. The printing apparatus according to claim 3, wherein the color printhead includes an ink-jet printhead which performs printing by discharging ink.

10. The printing apparatus according to claim 9, wherein in order to discharge ink by utilizing heat energy, the color printhead includes electrothermal transducers for generating heat energy to be applied to the ink.

11. The printing apparatus according to claim 6, wherein in a case where the color component data inputted by said input means includes only black component data and multi-pass printing is not performed, said determining means determines a print width of the first head unit as the print width and the conveyance amount of the print medium, and determines to clear all black component data used in printing.

12. The printing apparatus according to claim 6, wherein in a case where the color component data inputted by said input means includes only black component data and multi-pass printing is performed, said determining means determines the print width, the conveyance amount of the print medium, and black component data to be cleared upon printing, based on the number of times of scan and the print width of the first head unit.

13. The printing apparatus according to claim 6, wherein in a case where the color component data inputted by said input means includes all color component data and multi-pass printing is not performed, said determining means determines a print width of the second, third and fourth head units as the print width and the conveyance amount of the print medium, and determines to clear all the color component data used in printing.

14. The printing apparatus according to claim 6, wherein in a case where the color component data inputted by said input means includes all color component data and multi-pass printing is performed, said determining means determines the print width, the conveyance amount of the print medium, and density data to be cleared upon printing, based on the number of times of scan and the print width of the second, third and fourth head units.

15. The printing apparatus according to claim 3, wherein each of the plurality of buffer memories comprises a plurality of blocks for storing color component data necessary for each printing element of the color printhead to perform printing by a single scan of the color printhead, and the plurality of blocks are hierarchically distinguishable from a lowest block to a highest block.

16. The printing apparatus according to claim 15, wherein said input means inputs the color component data to the lowest block.

17. The printing apparatus according to claim 16, further comprising shift means for shifting color component data block by block to a higher block each time the color component data inputted by said input means fills the lowest block.

18. A computer program product, stored in a computer readable medium and executed in a computer, which executes printing control on a printer having a plurality of buffer memories, each temporarily storing color component print data and a printhead capable of printing a color image, said product comprising:

codes for executing an input process of inputting color component data to the plurality of buffer memories;

codes for executing a monitoring process of monitoring data storage with respect to the plurality of memories;

codes for executing a discriminating process of discriminating whether or not at least one of the plurality of buffer memories has become full based on a monitoring result in the monitoring process;

codes for executing a determining process of dynamically determining a print width, a conveyance amount of a print medium, and color component data to be cleared upon printing, based on a printable width of the color printhead and contents of the inputted color component data;

codes for executing a printing process of performing printing on the print medium by scanning the color printhead based on a discrimination result in the discriminating process and the print width determined in the determining process;

codes for executing a conveying process of conveying the print medium for the conveyance amount determined in the determining process; and codes for executing a releasing process of clearing the color component data, determined in the determining process, from the plurality of buffer memories.

19. The method according to claim 1, wherein the plurality of buffer memories are provided, corresponding to plural color component data, respectively, and said discriminating step discriminates that the plurality of buffer memories have become full when the plurality of buffer memories respectively store the plural color component data for the printable width of the color printhead.

20. The method according to claim 1, wherein the color image data is density data comprising black component data, cyan component data, magenta component data and yellow component data, the plurality of buffer memories include a first buffer for storing the black component data, a second buffer for storing the cyan component data, a third buffer for storing the magenta component data, and a fourth buffer for storing the yellow component data, and the color printhead includes a first head unit for performing printing in black ink, a second head unit for performing printing in cyan ink, a third head unit for performing printing in magenta ink, and a fourth head unit for performing printing in yellow ink, each performing printing in correspondence with each component data of the density data stored in the first, second, third and fourth buffers.

21. The method according to claim 20, wherein a ratio of a print width with respect to the first head unit to the second, third and fourth head units is 3:1, and an array of ink discharge nozzles which discharge ink from each of the first, second, third and fourth head units is arranged in a print medium conveyance direction.

22. The method according to claim 21, wherein the first, second, third and fourth head units are arranged in a color printhead scanning direction, and a ratio of a capacity with respect to the first buffer to the second, third and fourth buffers is 3:1.

23. The method according to claim 21, wherein the second, third and fourth head units are arrayed in line in the print medium conveyance direction, the first head unit and an assembly of the second, third and fourth head units are arranged in a color printhead scanning direction, and a ratio of the capacity with respect to the first, second, third and fourth buffers is 3:1:2:3.

24. The method according to claim 1, wherein the color printhead includes an ink-jet printhead which performs printing by discharging ink.

25. The method according to claim 24, wherein in order to discharge ink by utilizing heat energy, the color printhead includes electrothermal transducers for generating heat energy to be applied to the ink.

26. The method according to claim 21, wherein in a case where the color component data inputted at said input step includes only black component data and multi-pass printing is not performed, said determining step determines a print width of the first head unit as the print width and the conveyance amount of the print medium, and determines to clear all black component data used in printing.

27. The method according to claim 21, wherein in a case where the color component data inputted at said input step includes only black component data and multi-pass printing is performed, said determining step determines the print width, the conveyance amount of the print medium, and black component data to be cleared upon printing, based on the number of times of scan and the print width of the first head unit.

28. The method according to claim 21, wherein in a case where the color component data inputted at said input step includes all color component data and multi-pass printing is not performed, said determining step determines a print width of the second, third and fourth head units as the print width and the conveyance amount of the print medium, and determines to clear all the color component data used in printing.

29. The method according to claim 21, wherein in a case where the color component data inputted at said input step includes all color component data and multi-pass printing is performed, said determining step determines the print width, the conveyance amount of the print medium, and density data to be cleared upon printing, based on the number of times of scan and the print width of the second, third and fourth head units.

30. The method of claim 1, wherein each of the plurality of buffer memories comprises a plurality of blocks for storing color component data necessary for each printing element of the color printhead to perform printing by a single scan of the color printhead, and the plurality of blocks are hierarchically distinguishable from a lowest block to a highest block.

31. The method according to claim 30, wherein said input step inputs the color component data to the lowest block.

32. The method according to claim 31, further comprising a shift step of shifting color component data block by block to a higher block each time the color component data inputted at said input step fills the lowest block.

33. The product according to claim 18, wherein in a case where the print operation is performed by multi-pass printing, where printing is executed by scanning the color printhead plural times for the same area on the print medium, the discriminating process discriminates whether or not data storage with respect to each of the plurality of buffer memories has reached a predetermined amount, and the determining process determines the conveyance amount and color component data to be cleared, taking into account a number of times of scan of the color printhead for the same area.

34. The apparatus according to claim 3, wherein the plurality of buffer memories are provided, corresponding to plural color component data, respectively, and said discriminating means discriminates that the plurality of buffer memories have become full when the plurality of buffer memories respectively store the plural color component data for the printable width of the color printhead.

35. The product according to claim 18, wherein the plurality of buffer memories are provided, corresponding to plural color component data, respectively, and the discriminating process discriminates that the plurality of buffer memories have become full when the plurality of buffer memories respectively store the plural color component data for the printable width of the printhead.

* * * * *

UNITED STATES PATENT AND TRADEMARK OFFICE
CERTIFICATE OF CORRECTION

PATENT NO. : 6,261,010 B1
DATED : July 17, 2001
INVENTOR(S) : Masao Maeda

It is certified that error appears in the above-identified patent and that said Letters Patent is hereby corrected as shown below:

Drawings,
Figure 11, "COTS" (both occurrences) should read -- DOTS --.

Column 1,
Line 22, "and have" should read -- have --;
Line 23, "width)," should read -- width), and --; and
Line 43, "a in line" should read -- in a line --.

Column 3,
Line 24, "a in line" should read -- in a line --.

Column 10,
Line 65, "is are" should read -- is --.

Column 15,
Line 59, "being are" should read -- being --.

Signed and Sealed this

Fifth Day of March, 2002

Attest:

JAMES E. ROGAN
Attesting Officer
Director of the United States Patent and Trademark Office